(12) United States Patent
Wood (10) Patent No.: US 8,864,076 B2
(45) Date of Patent: Oct. 21, 2014

(54) ELONGATE COMPOSITE STRUCTURAL MEMBER

(75) Inventor: Eric Stephen Wood, Bristol (GB)

(73) Assignee: Airbus Operations Limited, Bristol (GB)

( * ) Notice: Subject to any disclaimer, the term of this patent is extended or adjusted under 35 U.S.C. 154(b) by 1291 days.

(21) Appl. No.: 12/602,163

(22) PCT Filed: Jun. 24, 2008

(86) PCT No.: PCT/GB2008/050485
§ 371 (c)(1),
(2), (4) Date: Nov. 30, 2009

(87) PCT Pub. No.: WO2009/004364
PCT Pub. Date: Jan. 8, 2009

(65) Prior Publication Data
US 2010/0178453 A1    Jul. 15, 2010

(30) Foreign Application Priority Data

Jun. 29, 2007 (GB) .................................. 0712549.5

(51) Int. Cl.
| | |
|---|---|
| *B64C 3/18* | (2006.01) |
| *B64C 1/06* | (2006.01) |
| *B29C 70/30* | (2006.01) |
| *B64C 3/26* | (2006.01) |

(52) U.S. Cl.
CPC .................. *B64C 3/182* (2013.01); *B29C 70/30* (2013.01); *B64C 3/26* (2013.01); *Y02T 50/433* (2013.01); *Y02T 50/43* (2013.01)
USPC ....................... 244/123.1; 244/119; 244/123.8

(58) Field of Classification Search
USPC ......... 244/123.1, 123.12, 123.14, 123.8, 124, 244/119, 120
See application file for complete search history.

(56) References Cited

U.S. PATENT DOCUMENTS

| | | | |
|---|---|---|---|
| 2,403,569 A | * | 7/1946 | Watter .......................... 244/124 |
| 2,471,490 A | | 5/1949 | Mercer |

(Continued)

FOREIGN PATENT DOCUMENTS

| | | |
|---|---|---|
| DE | 1452724 | 3/1969 |
| DE | 1452724 A1 | 5/1969 |

(Continued)

OTHER PUBLICATIONS

UK Search Report for GB0712553.7 dated Sep. 15, 2007.

(Continued)

*Primary Examiner* — Tien Dinh
*Assistant Examiner* — Steven Hawk
(74) *Attorney, Agent, or Firm* — Lowe Hauptman & Ham, LLP (57) ABSTRACT

A composite material elongate structural member, such as a spar or stringer, for use in an aerospace structure, comprises a web having an angled portion, for example in the form of a chamfer, curved surface or the like, which joins a foot of the member to the rest of the web. A first surface on the foot is shaped to abut a structure to be stiffened. The foot also has a second surface opposite the first surface. The web has a third surface and a fourth surface at the same layer in the composite material as the first and third surfaces, respectively. On/in the interposed portion there is a fifth surface which joins the first and third surfaces. The geometry of the member may vary along its length (L) so that with increasing distance, the first surface is displaced towards the second surface as the width of the fifth surface decreases. The risk of causing, during fabrication of the elongate member, undesirable creasing, stressing or stretching of composite material layers in a region in which the geometry of the member varies may be reduced by means of such an arrangement.

21 Claims, 8 Drawing Sheets

(56) References Cited

U.S. PATENT DOCUMENTS

| | | | |
|---|---|---|---|
| 2,655,194 A | 10/1953 | Nilsson | |
| 3,355,922 A | 12/1967 | Utashiro et al. | |
| 3,519,228 A * | 7/1970 | Windecker | 244/123.5 |
| 3,657,911 A | 4/1972 | Clarke et al. | |
| 3,838,590 A | 10/1974 | Van Dijk | |
| 4,006,617 A * | 2/1977 | Foster | 72/10.1 |
| 4,084,029 A * | 4/1978 | Johnson et al. | 428/119 |
| 4,331,723 A * | 5/1982 | Hamm | 428/61 |
| 4,913,910 A | 4/1990 | McCarville et al. | |
| 5,026,447 A * | 6/1991 | O'Connor | 156/166 |
| 5,036,688 A | 8/1991 | Gillean | |
| 5,074,139 A | 12/1991 | Elliott | |
| 5,096,525 A | 3/1992 | Engwall | |
| 5,171,510 A | 12/1992 | Barquet et al. | |
| 5,182,060 A | 1/1993 | Berecz | |
| 5,476,704 A * | 12/1995 | Kohler | 428/119 |
| 5,538,589 A | 7/1996 | Jensen et al. | |
| 5,729,462 A | 3/1998 | Newkirk et al. | |
| 5,820,804 A | 10/1998 | Elmaleh | |
| 5,848,765 A * | 12/1998 | Gillespie | 244/124 |
| 5,984,511 A * | 11/1999 | Vasey-Glandon et al. | 703/6 |
| 6,114,012 A * | 9/2000 | Amaoka et al. | 428/182 |
| 6,355,133 B1 * | 3/2002 | Williams | 156/296 |
| 6,375,120 B1 * | 4/2002 | Wolnek | 244/123.8 |
| 6,478,922 B1 * | 11/2002 | Rosevear et al. | 156/297 |
| 6,513,757 B1 * | 2/2003 | Amaoka et al. | 244/123.7 |
| 6,569,371 B1 | 5/2003 | Asari et al. | |
| 6,701,990 B1 | 3/2004 | Burley et al. | |
| 6,783,718 B2 | 8/2004 | Blanchon et al. | |
| 6,814,916 B2 | 11/2004 | Willden et al. | |
| 6,890,470 B2 | 5/2005 | Staub et al. | |
| 7,141,199 B2 | 11/2006 | Sana et al. | |
| 7,195,203 B2 | 3/2007 | Livingstone et al. | |
| 7,469,735 B2 | 12/2008 | Brown et al. | |
| 7,682,682 B2 * | 3/2010 | Leon-Dufour et al. | 428/119 |
| 8,104,714 B2 * | 1/2012 | Brown et al. | 244/123.8 |
| 8,276,848 B2 * | 10/2012 | Zuniga Sagredo | 244/123.8 |
| 2005/0116105 A1 * | 6/2005 | Munk et al. | 244/123 |
| 2007/0175573 A1 | 8/2007 | Fox et al. | |
| 2011/0095130 A1 * | 4/2011 | Luettig | 244/119 |

FOREIGN PATENT DOCUMENTS

| | | |
|---|---|---|
| EP | 0395224 A2 | 10/1990 |
| EP | 1070661 A2 | 1/2001 |
| EP | 1134070 | 9/2001 |
| EP | 1134070 A1 | 9/2001 |
| EP | 1408224 | 4/2004 |
| EP | 1547756 A1 | 6/2005 |
| EP | 1555204 A1 | 7/2005 |
| EP | 1566334 | 8/2005 |
| GB | 2312532 A | 10/1997 |
| JP | 59027722 | 2/1984 |
| JP | 59179228 | 10/1984 |
| JP | 61108404 A | 5/1986 |
| JP | 62207637 A | 9/1987 |
| JP | 04299110 A | 10/1992 |
| JP | 05042590 A | 2/1993 |
| JP | 6226356 | 8/1994 |
| JP | 7089353 | 4/1995 |
| JP | 08025386 A | 1/1996 |
| JP | 08085159 A | 4/1996 |
| JP | 10137853 A | 5/1998 |
| JP | 2003053851 A | 2/2003 |
| JP | 2004351882 A | 12/2004 |
| RU | 2144487 C1 | 1/2000 |
| RU | 2219058 C1 | 12/2003 |
| SU | 1304743 A3 | 4/1987 |
| WO | 0024563 | 5/2000 |
| WO | 0037244 | 6/2000 |
| WO | 0196094 A2 | 12/2001 |
| WO | 0222440 A1 | 3/2002 |
| WO | 03082670 A1 | 10/2003 |
| WO | 2005/105413 A2 | 11/2005 |
| WO | 2005105413 | 11/2005 |
| WO | 2005105413 A2 | 11/2005 |
| WO | 2009004362 | 1/2009 |
| WO | 2009004364 | 1/2009 |

OTHER PUBLICATIONS

ISR and WO for PCT/GB2008/050480 dated Apr. 22, 2009.
UK Search Report for GB0712552.9 dated Sep. 15, 2007.
ISR and WO for PCT/GB2008/050481 dated Mar. 30, 2009.
UK Search Report for GB0712549.5 dated Sep. 15, 2007.
ISR and WO for PCT/GB2008/050485 dated Mar. 31, 2009.
Russian OA—Decision on Granting with English translation dated Jun. 18, 2013.

* cited by examiner

ELONGATE COMPOSITE STRUCTURAL MEMBER

RELATED APPLICATIONS

The present application is a National Phase of PCT/GB2008/050485 filed Jun. 24,2008, and claims priority from British Application Number 0712549.5 filed Jun. 29,2007, the disclosures of which are hereby incorporated by reference herein in their entirety.

This application is related to concurrently filed applications titled COMPOSITE PANEL STIFFENER (National Phase of PCT/GB2008/050480)and ELONGATE COMPOSITE STRUCTURAL MEMBERS AND IMPROVEMENTS THEREIN (National Phase of PCT/GB08/050481). The related applications are incorporated by reference herein in their entirety.

TECHNICAL FIELD

The present invention concerns composite material structures for use in aerospace applications. More particularly, but not exclusively, this invention concerns an elongate composite structural member, for example in the form of a composite spar, a composite rib, a composite stringer, or the like. The invention also concerns a method of designing and a method of manufacturing such an elongate composite structural member, for example with the use of a suitably programmed computer.

BACKGROUND OF THE INVENTION

Elongate composite structural members, such as spars, ribs, stringers and the like are typically used to provide structural support in a structure on a global or local scale. Spars and ribs for example provide the main structural framework for an aerofoil box, fuselage section, or similar structure. Stringers for example are used as stiffening members.

Elongate composite structural members thus have portions that are adapted to abut another component, for example to stiffen, strengthen and/or to support such another component. The component against which the elongate composite structural abuts may for example be in the form of a panel or section of skin that defines a surface of an aircraft.

Such elongate composite structural members may have a cross-section in the form of a U-shape, in the form of a T-shape, in the form of an L-shape or other suitable shapes. Typically, the structural member will have a foot which has a shape adapted to abut the surface of the structure/component to be stiffened/supported and a web that projects from the foot away from the surface of the structure/component to be stiffened/supported, the web increasing the stiffness/strength of the structural member. The web is sometimes referred to as the blade of the structural member.

The thickness or geometry of the surface of the structure/component to be stiffened/supported may vary, thereby producing local features in the face of the structure/component adjacent to the structural member. Thus, corresponding variations in the geometry of the structural member may be necessary. Local variations in the geometry of the structural member can however introduce manufacturing problems when fabricating composite structural members. For example, in order to increase the local strength or stiffness of an aircraft component such as a wing panel, it is common practice to vary the thickness of the component locally where extra stiffness or strength is required. This results in pad-ups in the component profile in the surface that faces the structural member. Thus, the thickness of the component may, with increasing direction along the length of the associated structural member, ramp up to a locally thicker section and then ramp down to a thinner section. To accommodate the change in thickness in the component, the foot of the associated structural member needs to correspondingly ramp up and ramp down. The shape of the structural member may therefore include local variations in its cross-sectional geometry, as a function of distance along its length.

The desired shape of structural member for use when stiffening a panel may therefore be complicated and may deviate from a linearly symmetrical geometry. Manufacturing composite structural members having a complicated geometry can be difficult. If local changes in cross-sectional geometry of the structural member are required, defects may be introduced during the manufacturing process. Such defects usually result from layers of fibre material being compressed or folded in regions where there is too much material in view of the local geometry. This can produce creases in the final product, typically in the form of transverse creases. Defects can also result from layers of fibre material being stretched and/or stressed in regions where there is too little material in view of the local geometry. This too can produce creases in the final product, typically in the form of longitudinal creases. Either of the foregoing types of defect (too little material or too much material) can result in undesirable weakening of, and/or localised internal stresses in, the composite material in such regions. Such defects are typically allowed for and suitable margins built in by adding extra material in such regions, to counteract the strength-reducing defects. Whilst the strength of the resulting component may not be thus compromised, this technique introduces a weight penalty and excessive structural volume.

The present invention seeks to mitigate the above-mentioned problems. Alternatively or additionally, the present invention seeks to provide an improved shape of elongate composite structural member and/or an improved method of designing and/or manufacturing the same.

SUMMARY OF THE INVENTION

The present invention provides an elongate structural member for use in an aerospace structure, wherein
the structural member is made from composite material comprising a multiplicity of layers,
the structural member has a foot and a web extending from the foot,
the structural member defines along a part of its length:
a first surface on the foot being shaped to abut a structure (for example another component such as a wing panel),
a second surface on the foot being opposite the first surface,
a third surface on or in the web being at the same layer in the composite material as the first surface,
a fourth surface on the web being on the same side of the structural member as the second surface,
a fifth surface interposed between and joining the first and third surfaces, and
a sixth surface interposed between and joining the second and fourth surfaces,
for any cross-section of the structural member at any point along a part of the length of the structural member, the section being taken across a plane having its normal axis parallel to the length of the structural member, at least part of the fifth surface is inclined at an acute angle to the adjacent part of the first surface and at least part of the fifth surface is inclined at an acute angle to the adjacent part of the third surface, and wherein
the geometry of the structural member varies along said part of its length so that with increasing distance in a given direction along the length of the structural member the first surface is displaced towards the second surface as the width of the fifth surface decreases.

Thus, a composite structural member, for example a spar, a rib or a stringer, may have a portion (comprising the fifth and sixth surfaces) positioned between a part of the web of the member and a part of the foot of the member, the portion having a width which decreases as the foot of the member joggles up (moves in the direction from the first surface to the second surface). Matching the joggle on the foot with a corresponding change in width of the portion of the member comprising the fifth and sixth surfaces allows the layers of the composite material that form the structural member to be laid up during manufacture of the structural member in a manner that reduces the risk of local creasing, local stressing and/or local stretching, because changes in geometry in the foot (for example deviating from a simple linear geometry), which might otherwise result in defects, are offset by changes in the width of the aforesaid portion of the member.

The angle of inclination between the part of the fifth surface and the part of the first surface should be measured such that a zero angle of inclination would mean that the first and fifth surfaces join each other at a planar junction (i.e. the fifth surface would appear to be a continuous extension of, and to extend in the same general direction as, the first surface). By way of comparison, an angle of inclination of close to +/−180 degrees would be consistent with the fifth doubling back over the first surface, there being a sharp change in direction (close to a 180 degree turn) at the junction between the first and fifth surfaces.

It will be understood from the foregoing that the structural member may have a geometry such that for any cross-section of the structural member at any point along said part of the length of the structural member, at least part of the sixth surface is inclined at an acute angle to the adjacent part of the second surface and/or at least part of the sixth surface is inclined at an acute angle to the adjacent part of the fourth surface.

Reducing the risk of defects being formed may be achieved by means of ensuring that the geometry of the structural member is such that the developed width along a layer of the composite material of the member does not vary significantly as between successive transverse cross-sections of the structural member. For example, variations in the developed width that would otherwise be larger may be reduced by means of varying the width of the fifth and/or sixth surfaces of the member. Measuring such a developed width may be conducted by measuring the distance between the points at which a cross-section of the structural member intersects with first and second notional reference lines, the distance being measured along the surface of a layer of composite material in or on the structural member. In the context of this example of how to measure the developed width, the cross-section may for example be taken on a plane that has a normal axis parallel to the local lengthwise direction of the structural member. The first notional line may for example be positioned on the first surface and be so shaped that it is perpendicular to the direction in which the foot extends from the web at all such cross-sections. The second notional line may for example be positioned on the third surface and be so shaped that it is perpendicular to the direction in which the web extends from the foot at all such cross-sections.

Preferably, the developed width (for example measured as described above) is substantially constant, even though the cross-sectional geometry of the structural member varies along at least part of its length, for all such cross-sections of the structural member along said at least part of its length. A structural member according to an example of this aspect of the invention may have a foot adapted to abut the top of a lower wing panel, the member extending in a spanwise direction (i.e. transverse to the chordwise direction). The member may in this example have a geometry that has a constant developed transverse width (in the chordwise direction). The developed transverse width in the context of this example is the distance in the chordwise direction along the first, third and fifth surfaces from a point at a far end of the foot of the member to a point at the far end of the web of the member. Having such a constant developed width allows the layers of the composite material that form the member to be laid up during manufacture of the member in a manner that reduces the risk of local creasing or bunching of fibres in the composite material and/or local stretching.

The elongate structural member may have a cross-section that whilst varying with length has generally the same type of shape. The cross-sectional shape may be H-shaped, for example having two feet and a web that extends between the feet, projecting from or near the centre line of each foot. The cross-sectional shape may be U-shaped, for example having two feet and a web that extends between the feet, projecting from or near the edge of each foot. The cross-sectional shape may be Y-shaped, for example having two feet for abutting the same surface and a web that extends from the two feet, the web being in the form of a blade having an exposed end opposite the end that joins the two feet. The cross-sectional shape may be L-shaped, for example having one foot and a web that extends from an edge of the foot, the web being in the form of a blade having an exposed end opposite the end that joins the foot.

It will be appreciated that the invention as defined above relates to the structural member itself and does not necessarily include the structure (for example a component, such as a wing panel) against which the structural member is adapted to abut.

The elongate structural member of the present invention may form part of a structure on an aircraft. There may for example be provided a structural member, in the form of a stringer for example, and another component/structure, for example in the form of a wing panel of an aircraft, wherein the structural member is mounted on the component/structure.

The invention provides an aerospace structure (such as for example a fuselage, an aerofoil box, or a section thereof), an outer surface of which being defined by a skin, wherein an inner surface of the skin abuts a foot of an elongate structural member being in accordance with a structural member according to any to any aspect of the invention described or claimed herein. For example, the skin may be stiffened from inside the aerospace structure by means of a plurality of elongate structural members, for example stringers, mounted on the skin, each structural member being in accordance with the present invention.

The invention also provides an aircraft, an outer surface of which being defined by a skin, wherein an inner surface of the skin abuts a foot of an elongate structural member being in accordance with any aspect of the invention described or claimed herein.

The invention yet further provides a method of making a design model for an elongate composite structural member, wherein the structural member is a structural member according to any aspect of the invention described or claimed herein. The method may comprise the steps of:

providing first data defining the desired geometry of the foot of the structural member model, the separation of the foot from a datum plane varying along the length of the structural member, generating second data defining the geometry of the web of the structural member model including generating local changes in the geometry of the member at regions where it is ascertained from the first data that there are changes in the separation of the foot from the datum plane, and using said first data and said second data to output a structural member model including a foot and a web, The first data may form at least part of a collection of data that defines a model of the component/structure against which an elongate structural member is to be adapted to abut. The desired geometry of the foot of the elongate structural member model may therefore be derived indirectly from such a collection of data.

In embodiments of the present invention, the local changes in the geometry of the web are advantageously generated to reduce the risk of defects being created in a structural member made from layered composite material according to the structural member model. For example, the geometry of the web may include an angled region in the web, the angled region extending to the foot of the member and when viewed in cross-section being at an angle to the datum plane that is less than the angle between the rest of the web and the datum plane. The geometry of the web may include a chamfered region between the rest of the web and a foot of the model. The geometry of the web may include a curved surface (for example, a concave or a convex surface depending on which side of the model is viewed) between the rest of the web and a foot of the model.

The geometry of the web may be designed to reduce any change in distance as measured along the surface of the structural member model from a first datum line on the foot surface to a second datum line on the web surface. The first datum line may for example lie on an exterior surface on the foot of the structural member model, the line being so shaped that at all positions along its length it is perpendicular to the direction in which the foot extends from the web of the structural member model. The second datum line may lie on a surface on/in the web, the surface being at the same level in the model as the first surface (that is separated from an exterior surface of the web by the same distance (possibly zero) as the first datum line is separated from the same exterior surface on the foot).

The design method is preferably performed electronically, for example with the use of a suitably programmed computer. Once the structural member model is generated, a structural member may be manufactured in accordance with the model so generated. The design of the structural member model may be performed in one country, with electronic data representing the structural member model being exported to a different country for use in such a method of manufacture.

The present invention also provides a method of manufacturing a structural member, wherein the method comprises the steps of:

providing a mould tool having a profile dependent on a structural member model generated by means of a design method in accordance with any aspect of the invention described or claimed herein, laying up layers of composite material on the mould tool, and than curing the layers of composite material.

It will of course be appreciated that features described in relation to one aspect of the present invention may be incorporated into other aspects of the present invention. For example, the method of the invention may incorporate any of the features described with reference to the structural member of the invention and vice versa.

DESCRIPTION OF THE DRAWINGS

Embodiments of the present invention will now be described by way of example only with reference to the accompanying schematic drawings of which:

FIG. 2b is a sectional view of the stringer and wing panel taken along the plane F-F as shown in FIG. 2a;

DETAILED DESCRIPTION

Figure 1:
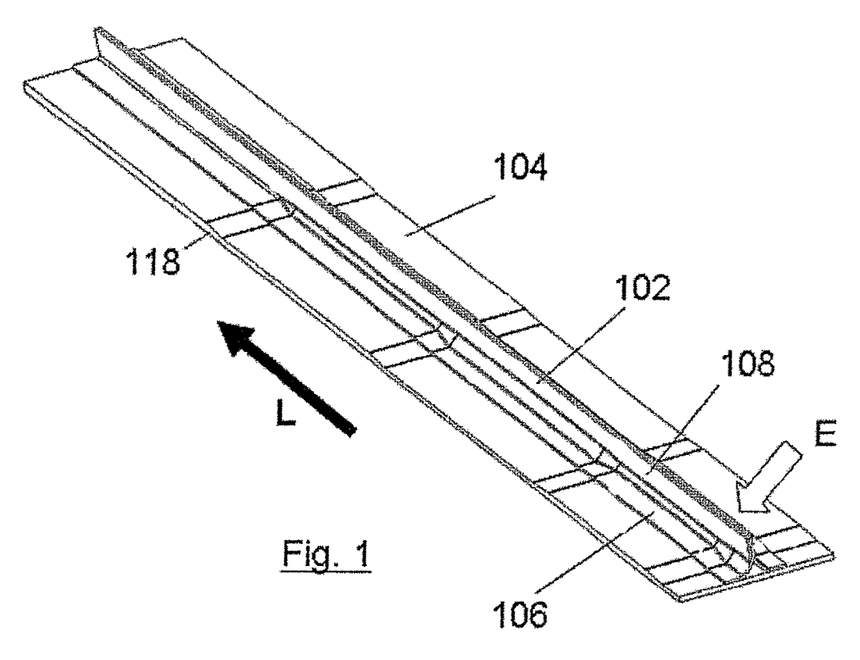
FIG. 1 shows in perspective view a Y-shaped stringer, according to a first embodiment of the invention, mounted on a wing panel, only a portion of which being shown in the Figure.

FIG. 1 shows in perspective an elongate structural member in accordance with a first embodiment of the invention. The structural member in this embodiment is in the form of a stringer 102. The stringer 102 is mounted on a wing panel 104, only a part of the wing panel 104 being shown in FIG. 1. The stringer 102 and wing panel 104 are both made from composite material, comprising multiple layers of material. The stringer 102 has a generally Y-shaped cross-section. The layers of the composite material (not individually shown in the Figures) of the stringer 102 follow the cross-sectional profile of the stringer in bulk. For example, in the region of feet 106 abutting the panel 104 the planes of the layers of fibre material are parallel to the upper surface of the panel 104. In the region of the top of the web (the part that extends perpendicularly to the panel surface) the planes of the layers of fibre material are parallel to the sides (left and right sides) of the web.

The Y-shape of the cross-section is inverted (in the orientation shown in FIG. 1) so that parts of the arms of the Y-shape abut the wing panel 104, thereby defining feet 106 of the stringer 102. The feet 106 lie parallel with the wing panel 104. The stalk of the Y-shape defines part of the web 108 (sometimes also referred to as the blade) of the stringer 102. The top of the web 108 (as shown in FIG. 1) extends in a direction that is perpendicular to the direction in which the feet extend across the panel 104. (It will be appreciated that the web could extend in a direction relative to the upper surface of the panel 104 at other angles).

For each side (left and right as seen in FIG. 1), there being one foot 106 per side, the stringer 102 has a first surface 110

(on the exterior of the stringer) on the underside of the foot 106 which abuts the wing panel 104. Opposite the first surface 110, there is a second surface 112 (also on the exterior of the stringer) on the foot 106. The upper part of the web defines a third surface 114, within the interior of the web 108, the third surface being at the same layer in the composite material structure as the first surface 110. There is also a fourth surface 116 (on the exterior of the stringer) being at the same layer in the composite material structure as the second surface 112. The fourth surface 116 is therefore on the web and on the same side of the stringer as the second surface 112. In this embodiment, the first, second, third and fourth surfaces 110, 112, 114, 116 are generally flat (planar).

Figure 2A:
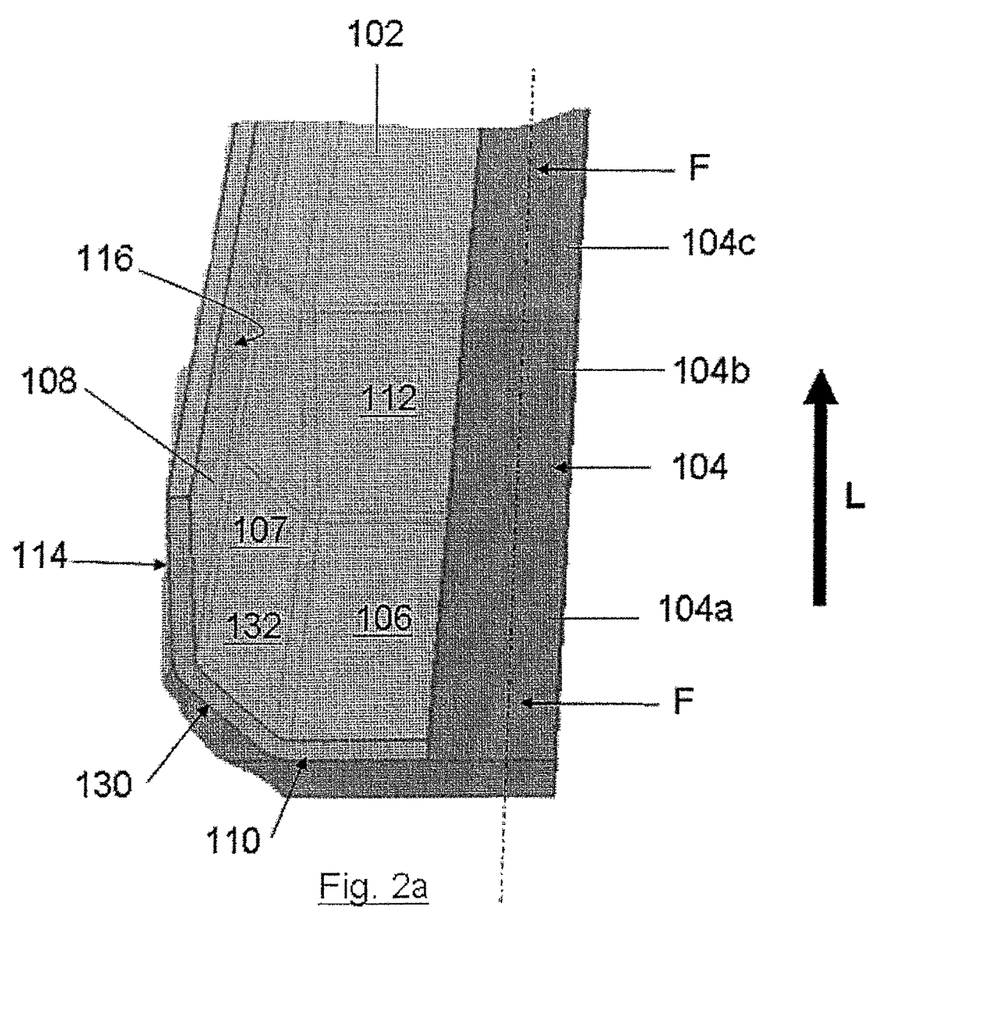
FIG. 2a shows in perspective a portion only of the stringer and wing panel of FIG. 1.

As can be seen from the edge 118 of the wing panel 104 shown in FIG. 1, the thickness of the wing panel 104 varies along the length L of the stringer 102, the wing panel 104 thus comprising successive regions, in the longitudinal direction L, of differing thicknesses. The wing panel 104 includes regions which are thicker than adjacent regions and ramping-up regions and ramping-down regions which effect the transition between regions of differing thicknesses. FIG. 2a shows a portion of the stringer 102 and wing panel 104 in the region indicated by the arrow E in FIG. 1. With reference to FIG. 2a, the panel thus has a thinner region (region 104a), which leads via a ramping-up region (region 104b) to a thicker region (region 104c). The feet 106 of the stringer similarly ramp up and ramp down so that the first surface 110 of the stringer 102 (the surface which abuts the wing panel 104) follows the upper surface (as shown in FIGS. 1 and 2a) of the wing panel 104. The thickness of the stringer in the region of the foot 106 and the web 108 remains substantially constant along the length of the stringer 102. Therefore, with increasing length L the second surface 112 on each foot 106 also follows the height of the upper surface (as shown in FIGS. 1 and 2a) of the wing panel 104 above a notional datum plane.

The stringer 102 on each side also includes a chamfer 107 that extends between the foot 106 and the web 108 of the stringer 102, the width of the chamfer 107 (as measured across the stringer) varying according to the height of the foot 106 from a notional datum plane 128. The chamfer 107 can clearly be seen in perspective in FIG. 2a.

The chamfer portion 107 that joins the foot 106 and the web 108 defines fifth and sixth surfaces 130, 132, the fifth surface 130 being interposed between and joining the first and third surfaces 110, 114 and the sixth surface 132 being interposed between and joining the second and fourth surfaces 112, 116. In this embodiment, the fifth and sixth surfaces 130, 132 are generally flat (planar). The first, third and fifth surfaces 110, 114, 130 are, in this embodiment, defined by the same ply (layer) of composite material of the stringer 102. Similarly, the second, fourth and sixth surfaces 112, 116, 132 are, in this embodiment, defined by the same ply (layer) of composite material of the stringer 102. The chamfer 107 in this embodiment extends at an angle of about 45° from the foot 106 and at an angle of about 45° from the web 108, the web 108 being perpendicular to the foot 106. The angle between the foot and chamfer and between the chamfer and the web may of course be different in other embodiments of the invention. The fifth and sixth surfaces 130, 132 are therefore non-parallel with any of the first, second, third and fourth surfaces 110, 112, 114, 116. The chamfer portion 107 may be considered as forming part of the web 108. It will be readily apparent to the skilled person that the chamfer portion 107 of the first embodiment has a well-defined extent, as a result of the changes in gradient (i) at the transition between the upper part of the web 108 and the chamfered portion 106 and (ii) at the transition between the chamfered portion 107 and the foot 106 of the structural member 102. Thus, the extent of the fifth and sixth surfaces in any given transverse cross-section will be readily ascertained.

Figure 2B:
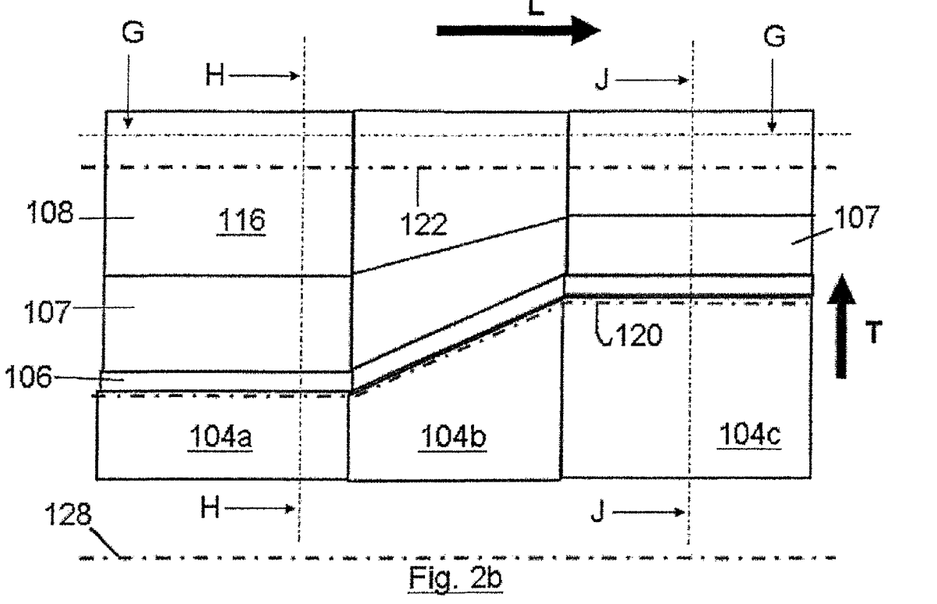
Figure 2C:
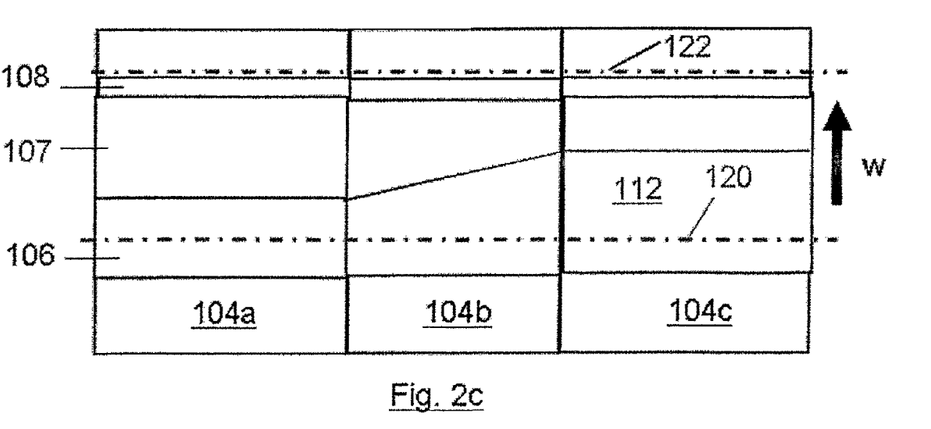
FIG. 2c is a sectional view of the stringer and wing panel taken along the line G-G shown in FIG. 2b.

FIGS. 2b and 2c show cross-sectional views of the stringer 102 along the planes F-F (shown in FIG. 2a) and G-G (shown in FIG. 2b), respectively. As can be seen by following the length of the stringer from left to right in FIGS. 2b and 2c (by following arrow L), the chamfer region 107 gets smaller as the height of the foot 106 of the stringer 102 above a notional datum plane 128 increases. Thus, the chamfer region 107 gets smaller as the foot 106 moves in the upwards direction (arrow T in FIG. 2b, which is in a direction transverse to the length L of the stringer and in the direction from the first surface 110 to the second surface 112 of a foot 106 of the stringer 102).

Figure 2D:
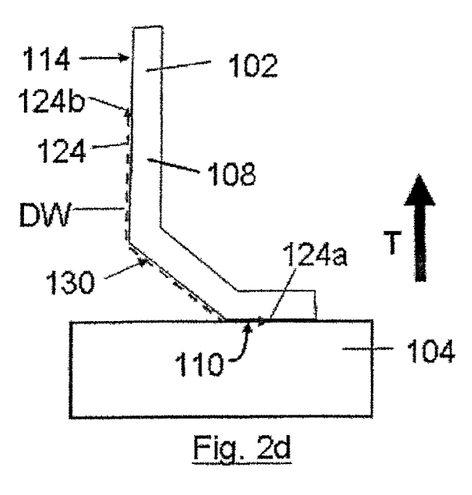
FIG. 2d is a sectional view of the stringer and wing panel taken along the plane H-H as shown in FIG. 2b.
Figure 2E:
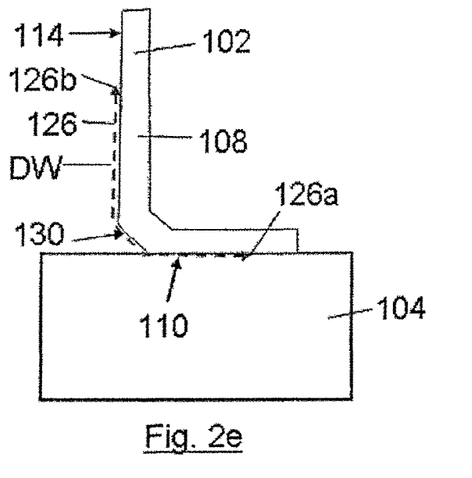
FIG. 2e is a sectional view of the stringer and wing panel taken along the plane J-J as shown in FIG. 2b.

FIGS. 2d and 2e show cross-sections of the stringer 102 and wing panel 104 taken along the vertical planes represented by lines H-H and J-J in FIG. 2b. FIGS. 2d and 2e illustrate that the developed width of the stringer as measured between two notional reference lines remains substantially constant along the length L of the stringer. Having such a constant developed width, despite changes in the cross-sectional geometry of the stringer 102, assists in reducing defects, for example creases, that might otherwise result when laying up the layers of the composite material that form the stringer 102. The dimension represent by such a developed width will now be explained with reference to FIGS. 2b to 2e.

FIGS. 2b and 2c show the positions of first and second notional lines 120, 122 between which the developed width of the cross-section of the stringer 102 is measured. The first notional reference line 120 and the second notional reference line 122 shown in FIGS. 2b and 2c, both generally follow, but are not always exactly parallel to, the length L of the stringer. The first notional line 120 lies on the first surface 110 of the stringer 102 and is so shaped that at all positions along its length it is perpendicular to the direction in which the foot 106 extends from the chamfered portion 107 of the web 108 (this direction, in this embodiment, being parallel to direction T as shown in FIG. 2b). In the case where the stringer 102 has a length L that lies along a generally straight axis, the first notional line 120 lies on a plane that is parallel to the length L of the stringer, the plane having a normal axis in the direction in which the foot extends from the web, this direction being parallel to direction W as shown in FIG. 2c. (It will be appreciated that in FIG. 2c, the first surface 110 is hidden from view, being behind the second surface 112.) As will be apparent, from FIGS. 2b and 2c, the first notional line 120, by following the first surface 110, includes angled portions to accommodate the ramping across region 4c.

The second notional line 122 lies on the third surface 114, the line 122 being so shaped that at all positions along its length it is perpendicular to the direction in which the top of the web 108 extends from the chamfered portion 107 and the foot 108 (this direction, in this embodiment, being parallel to direction W as shown in FIG. 2c). In the case where the stringer 102 has a length L that lies along a generally straight axis, the second notional line 122 lies on a plane that is parallel to the length L of the stringer, the plane having a normal axis in the direction in which the web extends from the chamfered portion, this direction being parallel to direction T as shown in FIG. 2b. (It will be appreciated that in FIG. 2b, the third surface 114 is hidden from view, being behind the fourth surface 116.) As will be apparent, from Figures 2b and 2c, the second notional line 122, by following the first surface 110, includes angled portions to accommodate the ramping across region 4c.

The developed width for a given cross-section of the stringer from the point on the first surface 110 coincident with the first notional line 120 to the point on the third surface 114 coincident with the second notional line 122 is substantially constant for all transverse cross-sections of the stringer 102. In this first embodiment, the developed width is kept constant by means of varying the width of the chamfered portion 107. With reference to FIGS. 2d and 2e, this is achieved by shortening the chamfered region 107 as the foot 106 of the stringer 102 moves upwards.

The cross-section illustrated by FIG. 2d shows the measurement of the developed width DW, that is, the distance between the first and second notional lines 120, 122 as measured along the surface of the stringer 102 at the cross-section. This measurement is represented by double-headed arrow 124 having a first end 124a, which coincides with the first notional line 120 (not shown in FIG. 2d) and having a second end 124b, which coincides with the second notional line 122 (not shown in FIG. 2d). Similarly, FIG. 2e showing the cross-section of the stringer at section J-J, includes a double-headed arrow 126 showing the measurement of the distance from the position 126a of the first notional line 120 (not shown in FIG. 2e) to the position 126b of the second notional line 122 (not shown in FIG. 2e) at the cross-section illustrated. The developed widths represented by the double-headed arrows 124, 126 in FIGS. 2d and 2e are substantially equal (that is, equal within allowable tolerances). In order to achieve this, the amount by which the first surface 110 moves in the direction T is offset by changing the width of the chamfered portion 107.

It will be noted that the horizontal position (as shown in FIGS. 2d and 2e) of the upper portion of the web 108 of the stringer 102 does not change with increased length L of the stringer. Thus, as can been seen in FIG. 1, the foot 106 and web 108 of one side of the stringer 102 may be symmetrical with the foot 106 and web 108 of the other side of the stringer, with the web 108 running along the centre line of the stringer with no joggles left or right.

Figure 2F:
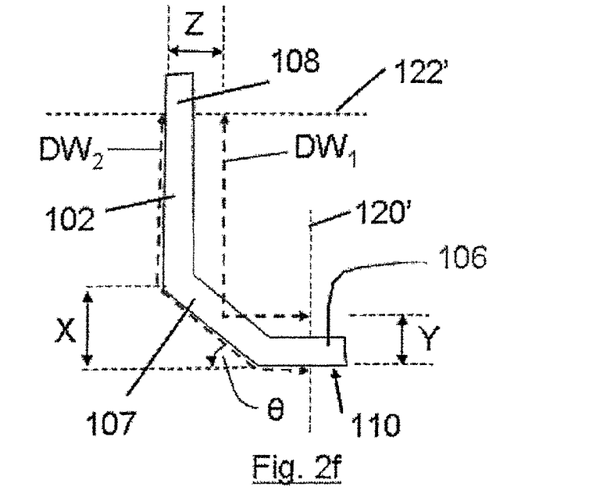
FIG. 2f shows the cross-section of the stringer shown in FIG. 2d, together with various indications of dimensions.

FIG. 2f shows how to calculate the width of chamfer required in order to maintain a constant developed width between the two notional lines at any given transverse cross-section. The developed width $DW_1$ for a stringer with no chamfer is shown next to the cross-section of a stringer 102 including a chamfer 107, the stringer having a developed width $DW_2$. It will be seen that the horizontal position of the first notional line is shown in FIG. 2f by means of the dashed line 120' and that the vertical position of the second notional line is shown by means of the dashed line 122'. The web 108 of the stringer 102 is offset from the unchamfered line $DW_1$ by a distance Z. The first surface 110 on the underside of the foot 106 is separated from the unchamfered line $DW_1$ by a vertical distance Y. The chamfer 107 extends from the foot 106 at an angle of θ and terminates at a vertical distance X above the first surface 110. Given desired offsets Y and Z, it is necessary to know at what distance the chamfer should start and stop and this can be calculated by means of the following formula:

$$X = \frac{Y+Z}{1 + \frac{1}{\tan\theta} - \frac{1}{\sin\theta}}$$

When, as in this case θ=45°, then this formula simplifies to:

$$X = 1.707 \times (Y+Z)$$

In the present (first) embodiment, the horizontal offset Z is constant and can be set to zero so that the web 108 of the stringer 102 does not joggle left or right. The above formula therefore further simplifies to X=1.707 Y.

Figure 3:
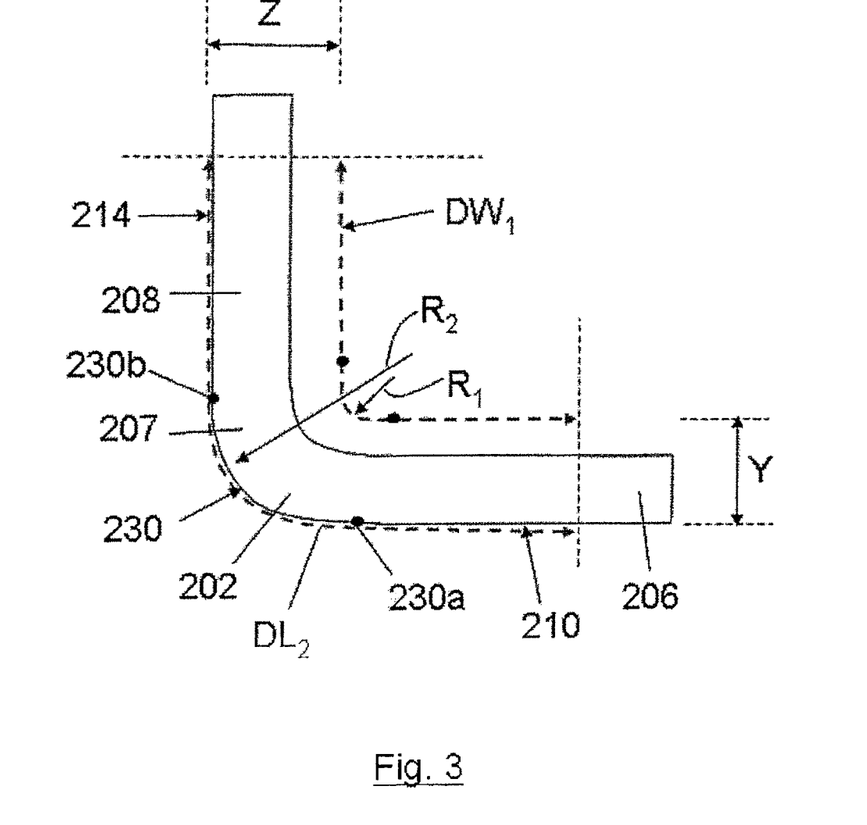
FIG. 3 shows a cross-section of a stringer in accordance with a second embodiment.

It will be appreciated that the developed width DW of the distance between the two notional lines may be maintained constant at any cross-section along the length of the stringer by means of introducing other features. For example, instead of providing a chamfer at the junction between the foot and the web of the stringer, a smooth transition may instead be provided, for example by means of a curved surface. FIG. 3 illustrates a second embodiment of the invention, which illustrates how such an alternative technique might be employed. Thus, the elongate member, in this embodiment being in the form of a generally L-shaped stringer 202 has a foot 206 and a web 208 including a curved portion 207, which is interposed between the foot 206 and the rest of the web 208. Again, a notional developed width $DW_1$ is set, at a position at which the foot 206 of the stringer 202 is at its highest. The developed width $DW_1$ is again measured along the surface of the stringer at the cross-section and thus passes over first, third and fifth surfaces of the stringer (the first, third and fifth surfaces being the same surfaces on/in the stringer as described above with reference to the first embodiment). Thus, the first surface 210 is positioned on the underside of the foot 206, the third surface 214 is positioned in the web 208, and the fifth surface 230 joins the first and third surfaces. In this second embodiment, the fifth surface 230 is defined by a smooth curve having a constant radius of curvature. The radius of curvature of the fifth surface corresponding to the notional developed width $DW_1$ is $R_1$. In order to maintain a constant developed width DW, the radius of curvature of the fifth surface may be changed to accommodate offsets in the vertical direction of the position of the foot 206 and/or to accommodate offsets in the horizontal direction of the position of the web 208, such offsets being illustrated in FIG. 3 by the distances Y and Z respectively. For given offsets Y and Z and for maintaining a constant developed width $DW=DW_1=DW_2$, the radius of curvature of the fifth surface 230 of the stringer 202, defined by radius $R_2$ must satisfy the following formula:

$$R_2 = R_1 + \frac{Y+Z}{2-\pi/2}$$

In the second embodiment, the extent of the curved portion 207 comprising the fifth and sixth surfaces may be readily ascertained as follows. The fifth surface may be considered as having an end (represented by dot 230a) at the junction between the web 208 and the foot 206, the extent of the first surface 210 (on the foot/feet) being defined, within the context of this example, by the area of the member that is adapted to abut the wing panel (not shown in FIG. 3). The opposite end (represented by dot 230b in FIG. 3) of the fifth surface 230 may be defined, within the context of this example, as the junction at which the web 208 of the structural member 202 (when viewed in cross-section) is no longer parallel to the upper straight portion of the web 208 (for example in this case, the junction at which the curved portion 207 meets the planar portion of the web 208). It will be noted that in the second embodiment, the first, second, third and fourth surfaces 210, 212, 214, 216 are generally flat (planar), whereas the fifth and sixth surfaces 230, 232 are not flat.

Figures 4A, 5A:
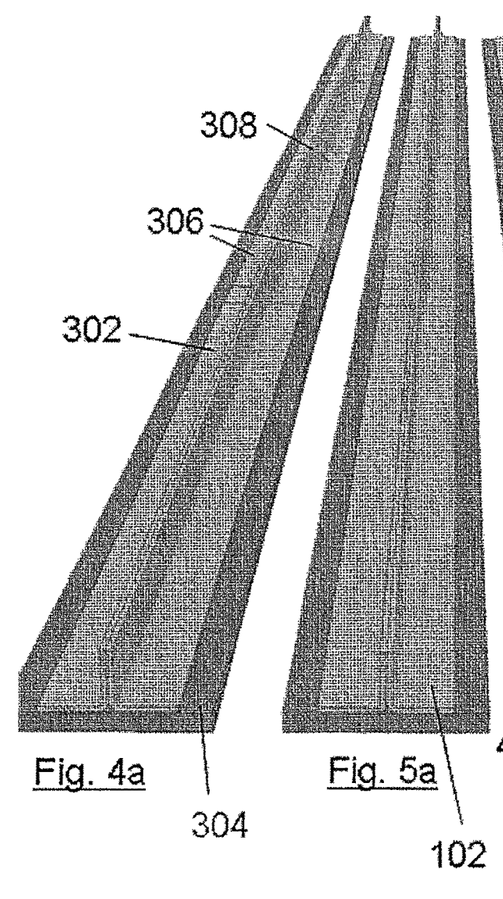
FIGS. 4a and 4b show a stringer in accordance with a third embodiment.
FIGS. 5a and 5b show a stringer in accordance with the first embodiment.
Figure 4B:
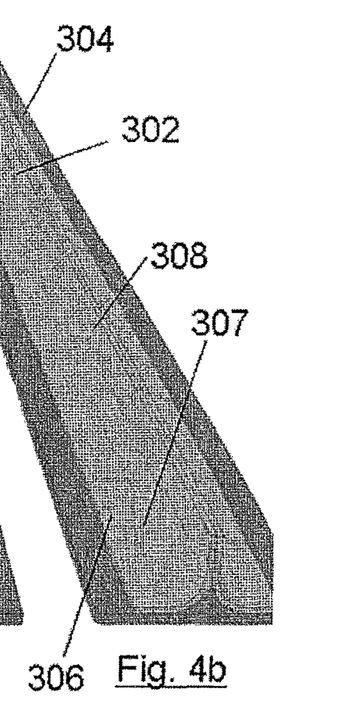

FIGS. 4a and 4b illustrate a stringer 302 in accordance with a third embodiment of the present invention. FIG. 4a shows the stringer 302 from one direction and FIG. 4b shows the stringer from the opposite direction. The stringer 302 has a cross-section generally in the form of an inverted Y, the stringer 302 including feet portions 306 and a web portion 308. Each foot portion 306 is connected to the web portion 308 via a curved portion 307. The curved portion 307 has a radius of curvature and a width that varies along the length of the stringer 302 as the feet 306 of the stringer joggle up and down to accommodate changes in thickness of the wing panel 304. The web 308 of the stringer follows a substantially straight line when viewed from above and does not therefore include any transverse joggles. The radius of curvature of the curved portion 307 thus satisfies the formula:

$$R_2 = R_1 + \frac{Y}{2 - \pi/2},$$

where Y represents a measure of the vertical displacement of the foot of the stringer above a notional datum plane and R1 is a preset constant.

Figures 5B, 6B:
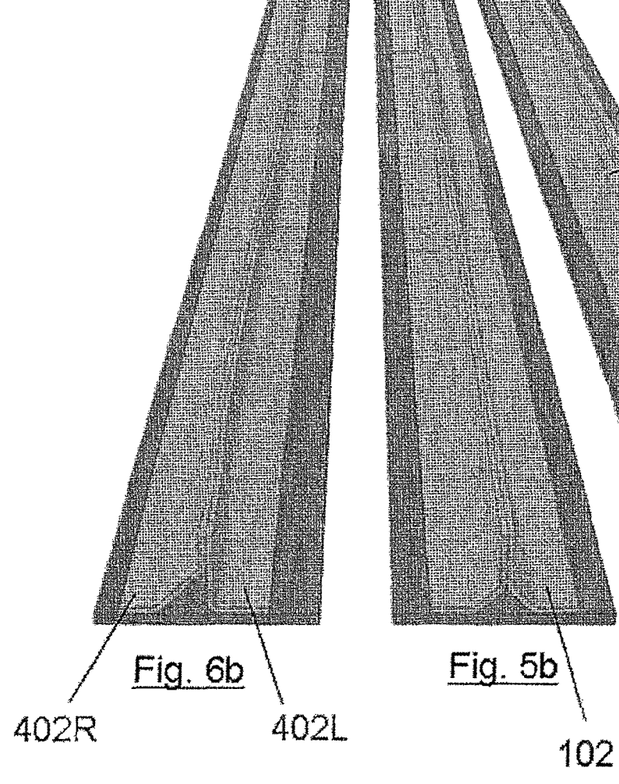
FIGS. 6a and 6b show a stringer in accordance with a fourth embodiment.

FIGS. 5a and 5b show opposite ends of a stringer in accordance with the first embodiment and are included to aid comparison between the stringers illustrated by FIGS. 4a to 6b.

Figure 6A:
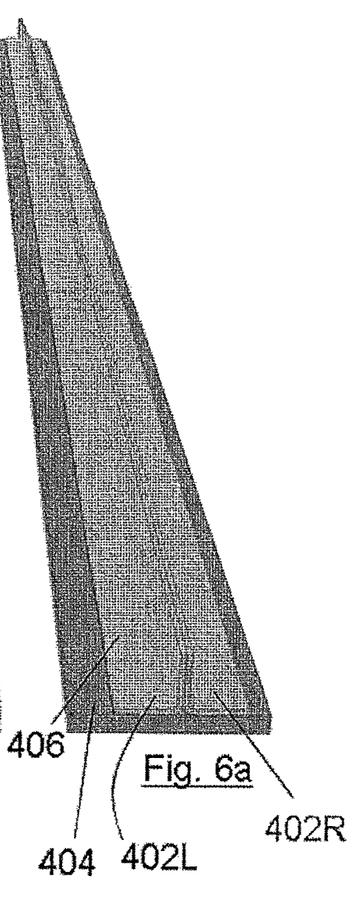

FIGS. 6a and 6b show a stringer 402 in accordance with a fourth embodiment. One half of the stringer utilises concepts from the first embodiment. The other half of the fourth embodiment utilises concepts derived from a joggled stringer having an L-shaped cross-section. Such a joggled stringer is described and claimed in the Applicant's copending UK patent application entitled "Composite Panel Stiffener" with reference XA2343, having the same filing date as the present application. The contents of that application are fully incorporated herein by reference. The claims of the present application may incorporate any of the features disclosed in that patent application. In particular, the claims of the present application may be amended to include features relating to the developed width of the stringer being substantially constant at successive cross-sections across the stringer. With reference to FIG. 6a, the left-hand part 402L of the stringer is defined by an L-shape that has a web that joggles left and right as the foot 406 of the stringer 402 joggles up and down to accommodate changes in thickness of the wing panel 404. The left-hand part 402L of the stringer is thus similar to the L-shaped stringer of the UK patent application mentioned above. The right-hand part 402R of the stringer (on the right as shown is FIG. 6a) includes a chamfered portion (most easily seen in FIG. 6b, when the stringer is viewed from the opposite end, in which view this part 402R of the stringer is shown on the left). The width of the chamfered portion varies in accordance with the joggling up and down of the foot as the wing panel thickness changes and also varies to accommodate the joggling of the web of the left hand side portion 402L of the stringer. The right-hand part 402R of the stringer is thus similar to one half of the stringer of the first embodiment of the present invention, in that it includes a chamfered portion to accommodate joggles in the geometry of the stringer, whilst maintaining a substantially constant developed width, which provides the advantages of reduced defects when manufacturing the multilayer composite stringer. It will be noted that the stringer of the fourth embodiment differs from the stringer of the first embodiment, in that the web of the stringer includes joggles left and right (in the orientation shown in FIGS. 6a and 6b).

Figure 7:
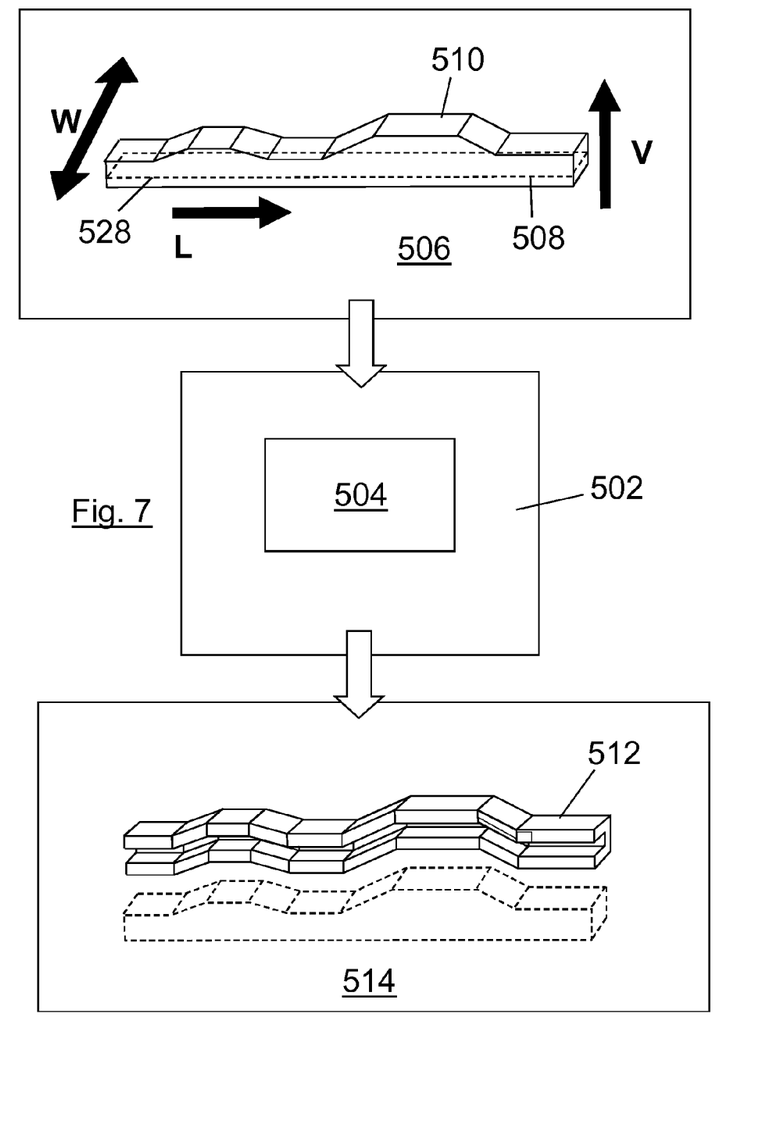
FIG. 7 shows a block diagram illustrating a design method in accordance with a fifth embodiment of the invention.

There will now be described a fifth embodiment relating to method of designing a computer model of an elongate structural member (in this embodiment in the form of a spar), the computer model subsequently being used to manufacture a composite spar from composite material. FIG. 7 shows a block diagram schematically illustrating a computer 502 programmed with software 504 which enables the computer 502 to perform the method according to the fifth embodiment.

There is provided a first data set 506 which defines the geometry of a wing panel model 508. The wing panel model 508 includes data that defines the geometry of the upper surface 510 (as shown in FIG. 7) of the wing panel 508. The spar model to be created is designed so that its lower surface abuts the upper surface 510 of the wing panel. Thus, the first data set 506 defines the separation of said surface 510 of the wing panel 508 from a reference/datum plane 528. The separation is measured in a direction indicated by the arrow V in FIG. 7. The spar model to be generated includes two feet, one of which has a geometry corresponding to the said surface 510 of the wing panel 508 and a web extending between said feet.

The method of the fifth embodiment includes a step in which the computer 502 receives the first data set 506 as input data. This first data set 506 effectively defines the desired geometry of the foot of the spar model, providing information concerning the separation of the foot from a reference/datum plane 528, the separation varying along the length of the spar (the length of the spar being shown in FIG. 7 by means of the arrow L). The software 504, with which the computer 502 is programmed, includes a module for processing the input data (first data set 506) to generate output data 514 defining the geometry of a spar model 512. The computer 502, under the control of the software 504, generates the geometry of the foot of the spar model and the geometry of the web of the spar model 512. The geometry of the web of the spar model 512 is generated by the computer as a function of the local changes in the geometry of the foot of the spar model. The way in which the geometry of the web of the spar model is generated may be in accordance with any of the above-described embodiments of the invention or variations thereof. For example, the web may be caused to joggle left and right across the width of the spar (see double-headed arrow W in FIG. 7) in a manner according to the fourth embodiment. Alternatively or additionally, a chamfer or radius may be introduced in the web (possibly reducing the width of the foot in certain regions) in accordance with any of the first to third second embodiments. Such local changes in the geometry of the web of the spar model reduce the risk of defects being created in a spar made from a layered composite material according to the spar model. Data 514 comprising data representing the geometry of the spar model 512 is then output from the computer 504.

Thus, in comparison to a nominal standard geometry of spar in which the web simply extends vertically from the edge of the foot, without any joggle, chamfer, radius or other feature that would affect the developed width of a line, which extends from a point on the web across the surface of the spar to a point on a foot of the spar when viewed in cross-section, the method effectively generates changes in the geometry of the web of the spar to offset changes in the geometry of the foot of the spar. For example, the geometry of the web of the spar model may be generated in such a way as to reduce any change in the distance as measured along the surface of the spar model from a first datum line on the foot surface following the length of the spar to a second datum line on the web surface following the length of the spar (see for example the notional lines 120 and 122 shown in FIGS. 2b and 2c of the spar of the first embodiment). Preferably, the web of the spar model is generated so that there is no change in distance as measured between such a first datum line and such a second datum line (the distance being substantially constant for each cross-section of the spar model as measured along the length of the spar). Manipulating and/or designing the spar model geometry in the manner described above enables a composite spar to be fabricated with plies (layers) of composite material that are forced to change from a flat geometry to a predefined non-uniform shape but without the bunching or stretching of fibres in the plies of material, which can lead to creases or defects in the spar thus produced.

Once the spar model 512 has been generated, various computational tests and modelling may be performed to assess the strength and other mechanical characteristics of the spar model to check that the spar, if manufactured, conforms to various criteria necessary for it to perform its function as a spar in a wing box or similar structure on a commercial aircraft. The spar model data 514 may then be used in a method of manufacturing a spar. The spar may be manufactured in accordance with standard techniques which are well known in the art. For example, hot drape forming techniques may be used to build-up the layers of the composite material on a mould tool, the tool having a profile in accordance with the geometry of the spar model 512 previously generated. The layers of composite material once laid up on the mould tool are cured in an autoclave in accordance with known techniques in the art.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The first to fourth embodiments concern the geometry of an elongate structural member in the form of a stringer, which in the above embodiments is mounted on a wing panel. In the fifth embodiment, the elongate structural member is in the form of a spar. It will of course be appreciated that the principles of the above-described embodiments of the invention could be applied to other parts of the structure of an aircraft where there is a panel or portion of skin of the aircraft that is supported and/or stiffened by means of a an elongate structural member. Thus, applications for embodiments of this invention could be widespread within the aerospace sector and include any instance where a composite structural member is required on a varying thickness component. Examples include spars, ribs and the like for use in the wing, tail-plane or other aerofoil boxes used on an aircraft.

The web of the stringer as shown in the Figures has an end surface (the top of the web as shown in the Figures) which lies on a substantially planar surface. The composite stringer may be machined after having been cured so that the top of the stringer web does not follow a substantially straight line. For example, the web may include one or more cut-outs to accommodate other components of the aircraft. Similarly, the foot of the stringer does not need to have an end surface (for example the edge of the stringer to the far right as shown in FIG. 2*a*) that lies on a substantially flat surface. The foot may for example include one or more cut-outs to accommodate other components of the aircraft or changes in geometry in the panel which the stringer abuts.

The stringer is shown in the Figures as extending lengthwise along a substantially straight line. Wing panels and other aerofoil surfaces on aircraft are typically curved and are non-planar. As such, it is likely that the stringer will have a shape than extends in one general direction, but which deviates from the straight line geometry of the exemplary stringers illustrated schematically by the accompanying drawings. It will also be appreciated by those skilled in the art that changes in gradient along the surface of the stringer will be gradual as it is difficult for composite materials to have sharp changes in gradient without performing additional machining steps.

It is within the scope of the present invention for sections of an elongate structural member to be in accordance with one or more of the above-mentioned embodiments, and other sections of the structural member not to be in accordance with any of the above embodiments. For example, only part of the length of the structural member may be in accordance with an aspect of the present invention. Said part of the length of the structural member may however represent the majority of the length of the structural member.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. An elongate structural member for use in an aerospace structure, wherein
   the structural member is made from composite material comprising a multiplicity of layers,
   the structural member has a foot and a web extending from the foot,
   the structural member defines along a part of its length:
      a first surface on the foot being shaped to abut the aerospace structure,
      a second surface on the foot being opposite the first surface,
      a third surface on or in the web being at the same layer in the composite material as the first surface,
      a fourth surface on the web being on the same side of the structural member as the second surface,
      a fifth surface interposed between and joining the first and third surfaces, and
      a sixth surface interposed between and joining the second and fourth surfaces,
      for any cross-section of the structural member at any point along a part of the length of the structural member, the section being taken across a plane having its normal axis parallel to the length of the structural member, at least part of the fifth surface is inclined at an acute angle to the adjacent part of the first surface and at least part of the fifth surface is inclined at an acute angle to the adjacent part of the third surface,
   and wherein
   the geometry of the structural member varies along said part of its length so that with increasing distance in a given direction along the length of the structural member the first surface is displaced in a direction towards the second surface as the width of the fifth surface decreases, whereby the risk of causing, during fabrication of the elongate structural member, undesirable creasing, stressing or stretching of composite material layers in a region in which the geometry of the elongate structural member varies with increasing distance along its length is reduced.

2. A structural member according to claim 1, wherein the fifth and sixth surfaces are at least partially on or in the web of the structural member.

3. A structural member according to claim 1, wherein the fifth and sixth surfaces are defined by a chamfer that extends from the foot of the structural member to a part of the web.

4. A structural member according to claim 3, wherein there is a change of gradient in the surfaces of the structural member at the junction between the chamfer and the foot of the structural member, and there is a change of gradient in the surfaces of the structural member at the junction between the chamfer and the web of the structural member.

5. A structural member according to claim 1, wherein the fifth and sixth surfaces are defined by a curved region of the structural member that extends from the foot of the structural member to a part of the web.

6. A structural member according to claim 5, wherein at the junction between the curved region and the foot of the structural member, the curved region is parallel to the foot, and wherein at the junction between the curved region and the web of the structural member, the curved region is parallel to the web.

7. A structural member according to claim 5, wherein the curved region has a radius of curvature that is substantially constant at any given transverse cross-section.

8. A structural member according to claim 1, wherein, with increasing distance in said given direction along a portion of the length of the structural member, the first surface is displaced in a direction towards the second surface, but the third surface is not displaced either towards or away from the fourth surface.

9. A structural member according to claim 1, wherein, with increasing distance in said given direction, the first surface is displaced in a direction away from the second surface as the cross-sectional length of the fifth surface increases.

10. A structural member according to claim 1, wherein, with the cross-sectional geometry of the structural member varies along at least part of its length so that the distance between the points at which a cross-section of the structural member intersects with first and second notional reference lines is substantially constant for all such cross-sections of the structural member along said at least part of the length, the distance being measured along the surface of the structural member at the cross-section, each cross-section being taken on a plane that has a normal parallel to the local lengthwise direction of the structural member, the first notional line being positioned on the first surface and being perpendicular to the direction in which the foot extends from the web, the second notional line being positioned on the third surface and being perpendicular to the direction in which the web extends from the foot.

11. A structural member according to claim 1, wherein the member is in the form of a rib.

12. A structural member according to claim 1, wherein the member has a cross-sectional shape which is generally H-shaped.

13. A structural member according to claim 1, wherein the member is in the form of a spar.

14. A structural member according to claim 1, wherein the member has a cross-sectional shape which is generally U-shaped.

15. A structural member according to claim 1, wherein the member has a second foot, the web of the member extending between its two feet.

16. A structural member according to claim 1, wherein the member is in the form of a stringer.

17. A structural member according to claim 1, wherein the member has a cross-sectional shape which is generally Y-shaped.

18. A structural member according to claim 1, wherein the member has a cross-sectional shape which is generally L-shaped.

19. An aerospace structure, an outer surface of which being defined by a skin, wherein an inner surface of the skin abuts a foot of an elongate structural member being in accordance with a structural member according to claim 1.

20. An aircraft, an outer surface of which being defined by a skin, wherein an inner surface of the skin abuts a foot of an elongate structural member being in accordance with a structural member according to claim 1.

21. A structural member according to claim 1, wherein along said at least part of the length of the structural member the thickness between the first surface and the second surface is substantially constant.

* * * * *